United States Patent [19]

Kato

[11] Patent Number: 4,663,548

[45] Date of Patent: May 5, 1987

[54] MAGNETOHYDRODYNAMIC POWER GENERATOR

[75] Inventor: Ken Kato, Ibaraki, Japan

[73] Assignees: Agency of Industrial Science and Technology; Ministry of International Trade and Industry, both of Tokyo, Japan

[21] Appl. No.: 838,821

[22] Filed: Mar. 12, 1986

[30] Foreign Application Priority Data

Mar. 13, 1985 [JP] Japan .................................. 60-49878

[51] Int. Cl.$^4$ ............................................. H02N 4/02
[52] U.S. Cl. ............................................................ 310/11
[58] Field of Search .......................................... 310/11

[56] References Cited

U.S. PATENT DOCUMENTS

| | | | |
|---|---|---|---|
| 3,259,767 | 7/1966 | Way et al. ...................... | 310/11 |
| 3,309,545 | 3/1967 | Emmerich ........................ | 310/11 |
| 3,355,607 | 11/1967 | Rosa ................................ | 310/11 |
| 3,397,331 | 8/1968 | Burkhard ......................... | 310/11 |
| 3,505,543 | 4/1970 | Klein et al. ...................... | 310/11 |
| 3,508,087 | 4/1970 | Millet et al. ..................... | 310/11 |
| 4,268,765 | 5/1981 | Hoover, Jr. ..................... | 310/11 |
| 4,447,748 | 5/1984 | Young et al. ................... | 310/11 |

*Primary Examiner*—Donovan F. Duggan
*Attorney, Agent, or Firm*—Oblon, Fisher, Spivak, McClelland & Maier

[57] ABSTRACT

A magnetohydrodynamic power generator is provided in the cathode wall constituting one part of its generating channel with an oxidizing agent injection device. By supplying oxidizing agent to the surface of cathodes through this injection device, the reducing atmosphere in the vicinity of the cathodes is neutralized, thereby preventing short-circuiting between adjacent electrodes.

5 Claims, 4 Drawing Figures

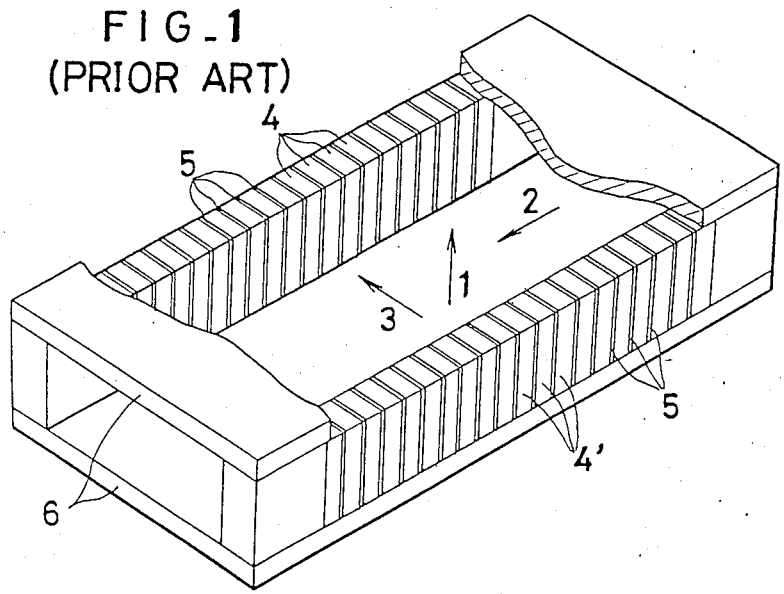
FIG_1 (PRIOR ART)
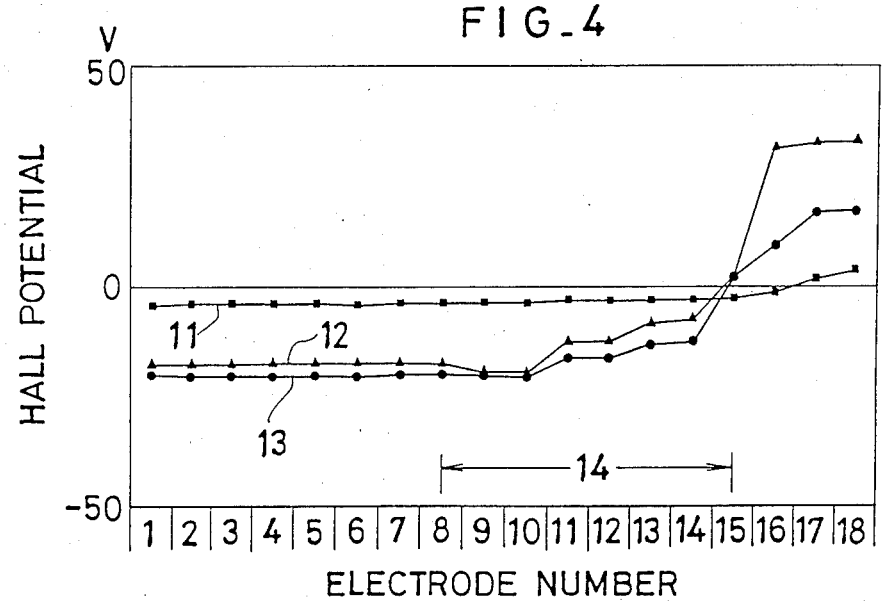
FIG_4

FIG_2
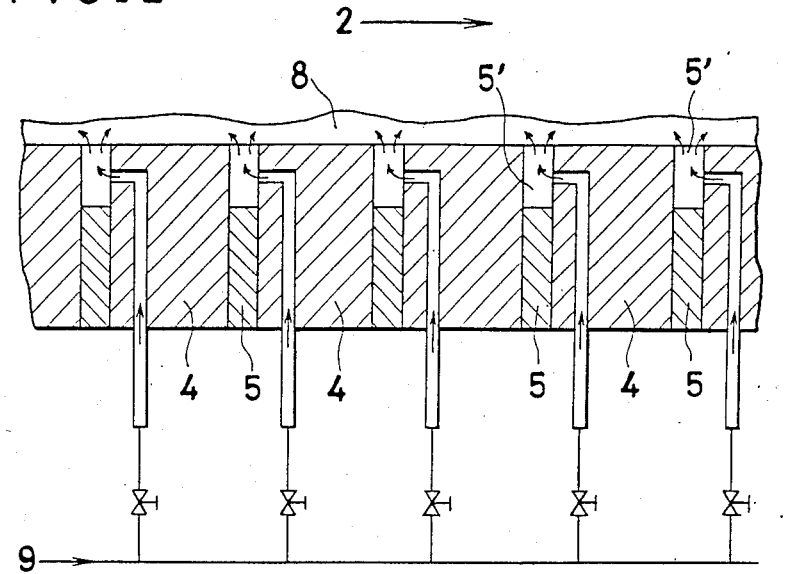
FIG_3
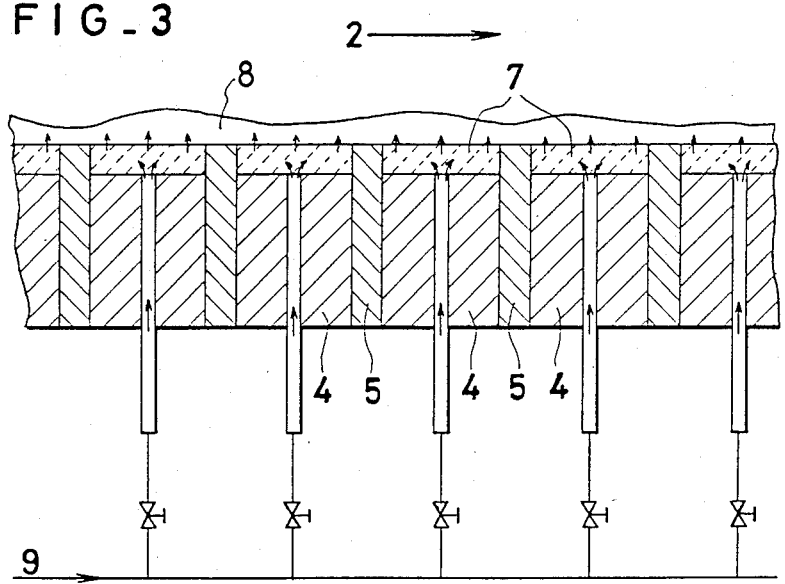

MAGNETOHYDRODYNAMIC POWER GENERATOR

FIELD OF THE INVENTION AND RELATED ART STATEMENT

This invention relates to a coal-fired magnetohydrodynamic (MHD) power generator.

The MHD electric power generation is a direct electrical power generation in which a high-temperature (2000–3000K) combustion gas added with an easily ionizable compound of an alkaline metal such as potassium as a seeding material is passed as a working fluid through a generating channel in a magnetic field. As no turbine or other moving parts are required, the MHD power generator system can use a power generator of simple construction and can operate on a wide variety of fuels. When an MHD power generator is cobined with a conventional steam electric power generation plant, it becomes possible to increase the overall thermal efficiency from the approximately 40% of the conventional steam plant alone to about 50%. MHD electric power generation is thus a useful technology capable of conserving coal and other fossil fuels. As shown in FIG. 1, when a combustion gas 2 is passed in a direction perpendicular to the direction of a magnetic field 1, an electromotive force 3 is generated in the direction perpendicular to the aforesaid two directions. When electric current flows through the combustion gas in the magnetic field during electric power generation, the interaction of the magnetic field gives rise to a voltage, known as the Hall voltage, in the direction of flow of the combustion gas. When this Hall voltage is short-circuited, the flow of current becomes to deflect and the electric power output of the generator decreases. For this reason, the cathode 4 and the anode 4' for extracting the generated electric current are, as shown in FIG. 1, finely divided into series of unit electrodes in the direction of combustion gas flow, with adjacent unit electrodes being insulated from each other by insulators 5 provided therebetween in order to prevent current from short-circuiting between adjacent unit electrodes because of the Hall voltage.

Since the MHD generator is driven by a high-temperature, high-velocity combustion gas, the walls of the generating channel is subject to severe abrasion. Even so, by using relatively strong electrodes made from metal cooled with water in combination with insulation walls cooled with water, so as to keep the wall temperature relatively low, it is currently possible to realize MHD power generators with a service life of around 1000 hours or so. Referring again to FIG. 1, reference numeral 6 denotes an insulating wall which, together with the cathode electrodes 4, anode electrodes 4' and insulators 5, forms a generating channel.

In an MHD generator using coal combustion gas as the operating fluid and designed to keep the surface temperature of the generating channel relatively low, there is a tendancy for the coal slag and alkaline metal compound in the combustion gas to adhere on the surface of the channel. When this happens, current will flow through the adhered material at the electrodes, giving rise to an electrochemical reaction which, on the cathode will reduce the electrical resistance of the adhered material and cause short-circulting between the adjacent electrodes provided as separated from each other in the direction of combustion gas flow for the purpose of insulating them from each other with respect to the Hall voltage. As a result, the electric power output falls while, at the same time, excessively large voltages and current concentrations arise locally between adjacent unit electrodes, shortening the service life of the power generator.

The decrease in the electrical resistance of the material adhered on the chathodes is quessed to result from the fact that the passage of electric current transportation gives rise to an electrochemical reaction which produces a strongly reductive atmosphere in the vicinity of the chathode, whereby components of the coal ash (e,g, $Fe_2O_3$) are reduced to compounds having low electric resistance (e.g. $Fe_3O_4$ or pure Fe) while potassium and other alkaline metal compounds of the seeding materials are reduced to pure metals. In experiments conducted with a coal-fire MHD power generator it has been confirmed that following the current transportation, the adhered material on the cathode exhibits an increase in $Fe_3O_4$ content or the precipitation of pure iron or metallic potassium.

OBJECT AND SUMMARY OF THE INVENTION

An object of the invention is to provide an MHD power generator wherein decrease of power output is prevented and performance is upgraded by preventing or suppressing short-circuiting between adjacent electrodes.

The aforesaid object is achieved by providing a coal-fired MHD power generator comprising an anode and a cathode for deriving generated electric current elecrode walls of which are each constitued of electrodes disposed in the flow direction and insulators for providing electrical insulation against the Hall field generated in the flow direction wherein an injection device is provided for supplying to the cathode an oxidizing agent for preventing short-circuiting between the adjacent electrodes thereof.

In the present invention, the oxidizing agent such as air or oxygen supplied to the cathode wall neutralizes the reductive effect caused at the cathode by the passage of current, thus preventing decrease of the electrical resistance of the adhered material. Moreover, substances contained in the material caused to adhere on the cathode by the current-induced electrochemical reaction, e.g. precipitated metals such as potassium or substances with low electrical resistance such as $Fe_3O_4$, are oxidized by the injected oxidizing agent, converting them into substances with higher electrical resistances, thus preventing and/or eliminating short-circuiting between adjacent electrodes.

The other objects and features of the invention will be better understood from the following detailed explanation made in conjunction with the attached drawings.

BRIEF EXPLANATION OF THE DRAWING

FIG. 1 is a schematic perspective view of one section of a generating channel of an MHD power generator.

FIG. 2 is a longitudinal sectional view of one example of a cathode wall used in an MHD power generator according to the present invention.

FIG. 3 is a longitudinal sectional view of another example of a cathode wall used in an MHD power generator according to the present invention.

FIG. 4 is a graph showing the results obtained with a 1.5 kW thermal input MHD power generator according to the present invention.

DESCRIPTION OF PREFERRED EMBODIMENTS

Referring to FIG. 2, there is shown a longitudinal section of a cathode wall constituting one part of the generating channel of the MHD power generator according to the present invention. The cathode wall is constituted of a series of unit (modular) cathode electrodes 4 each disposed to lie perpendicular to the direction of flow of the combustion gas plasma 2, which is indicated by an arrow, and insulators 5 made of $SiO_2$, $Al_2O_3$ or the like, and disposed one between each adjacent pair of unit electrodes 4 for preventing short-circuiting between the electrodes. The electrodes 4 are made from copper, copper alloy or the like and are slightly longer than the insulators 5. The unit electrodes 4 and the insulator 5 are disposed with the insulators 5 set back slightly from the wall face along which the plasma flows, thus forming a recess (gap) 5' in this wall face between each adjacent pair of electrodes 4.

For each unit electrode 4 there is provided a pipe 9' connected at one end to an oxidizing agent supply system 9. Each pipe 9' passes through the interior of the associated unit electrode 4 and opens into the side wall of the recess 5' on one side thereof.

Alternatively, as shown in the embodiment of FIG. 3, each of the electrodes 4 can be provided on its surface with a porous member 7, and the pipe 9' can be positioned with its open end at the surface of the electrode. As the material of the porous member 7 there can be used, for example, a sintered metal.

Thus as is clear from the foregoing, the present invention provides an oxidizing agent injection device whereby oxidizing agent is supplied from the oxidizing agent supply system 9, through the material constituting the cathode, and to the cathode surface or to the inter cathode gaps, thereby enabling prevention of short-circuiting between cathode electrodes 4. The injected oxidizing agent contacts the material 8 adhered on the cathode, thus neutralizing the reductive action of the cathode, and also oxidizes materials which have been reduced, thereby preventing decrease in the electrical resistance of the adhered material and preventing short-circuiting between neighboring electrodes 4. When oxygen is used as the oxidizing agent, the amount thereof required to be supplied for neutralization at each unit electrode can be calculated as:

$$Q = a/\eta \times I/(4F)$$

where Q is the amount of oxygen supply (mol/sec), a is the reaction ratio required for the insulation (not greater than 1), $\eta$ is the reaction efficiency, I is the current per electrode, and F is the Faraday constant. As an oxidizing agent air is used in place of oxygen.

The effect of the present invention was experimentally investigated by providing the 8th to 15th electrodes (as numbered in the direction of gas plasma flow) of the cathode wall forming one side of the generating channel of an MHD power generator with an oxidizing agent injection device of the type shown in FIG. 2, and using the so-provided injection device to inject oxygen into the inter-cathode gaps as the oxidizing agent. The results of the experiment are shown by the graph in FIG. 4, wherein the Hall potential of cathode is represented on the longitudinal axis and the electrode number is represented on the lateral axis. In the graph, the curve 11 (■) shows the Hall potential distribution when no oxygen was injected, the curve 12 (▲) that when oxygen was injected at the total rate of 0.01 g/sec, and curve 13 (●) that when oxygen was injected at the total rate of 0.1 g/sec. In the graph, the numeral 14 indicates the insulator region subject to oxygen injection. As will be noted when oxygen is injected in this manner, the slope of the Hall potential becomes sharp and a high Hall voltage is produced, indicating that short-circuiting between cathodes was eliminated. In connection with the foregoing experiment it should be noted that the amount of oxygen injection (0.01–0.1 g/sec) is very small, amounting to only between 1/1500 and 1/15000 of the amount of operating combustion gas flow (150 g/sec), so that the injected oxygen has virtually no effect of the stream of plasma gas.

As the problem of short-circuiting between cathodes is eliminated in the coal-fired MHD power generator according to this invention, the power output is increased by the amount that would otherwise be lost owing to Hall voltage short-circuiting. Moreover, since no deflection of current distribution or excessive concentration of voltage between adjacent electrodes arises, erosion of the electrodes and other components of the generator is uniform, resulting in longer service life for the power generator as a whole. Further, since the local occurence of large voltages between adjacent electrodes is prevented, it becomes possible in designing the generator to assume a higher permissible average Hall electric field, which in turn makes it possible to employ a stronger magnetic field and a more rapid flow rate for the operating fluid. Therefore, the invention enables an increase in output density and the realization of a higher performance, more compact MHD power generator. What is more, it is possible to obtain the aforesaid effects by injecting onto the cathode only a very small amount of oxidizing agent as compared with the amount of combustion gas flow. For example, it can be estimated that in a commercial 600 MW class plant it would be adequate to inject oxygen at the rate of only about 0.0015% of the total mass flow rate of combustion gas.

What is claimed is:

1. In a coal-fired magnetohydrodynamic power generator comprising electrodes for deriving generated electric current, said electrodes being exposed and separated from one another in the direction of flow of a combustion gas and having electrode surfaces kept at temperatures allowing a seeding material contained in said combustion gas to be coagulated and insulators provided between adjacent pairs of said electrodes for providing electric insulation with respect to produced Hall voltage, the improvement comprising means for injecting between adjacent pairs of cathodes of said electrodes a gas containing oxygen in an amount of 1/1500 to 1/15000 of the amount of operating combustion gas flow.

2. A magnetohydrodynamic power generator according to claim 1, wherein said gas containing oxygen converts said coagulated material into highly electric resistant materials, preventing short circuiting and deterioration of the electrodes and allowing the generator could operate at high efficiency.

3. A magnetohydrodynamic power generator according to claim 2, wherein the oxidizing agent injection device comprises at least one pipe having its one end connected with an oxidizing agent supply system and its other end opening at the surface of the cathode wall.

4. A magnetohydrodynamic power generator according to claim 3, wherein a recess is formed between adjacent cathodes and said pipe opens in said recess.

5. A magnetohydrodynamic power generator according to claim 1 wherein a porous member is provided on said cathode and said pipe opens at the boundary between the cathode and the porous member.

* * * * *